United States Patent [19]

Kageyama et al.

[11] Patent Number: 4,695,508

[45] Date of Patent: Sep. 22, 1987

[54] ADHESIVE COMPOSITION

[75] Inventors: Kunio Kageyama, Yokohama; Sumio Takasugi, Hiratsuka, both of Japan

[73] Assignee: The Yokohama Rubber Co., Ltd., Tokyo, Japan

[21] Appl. No.: 773,278

[22] Filed: Sep. 6, 1985

[51] Int. Cl.$^4$ .......................... C09J 7/02; H01B 1/22; H01B 1/26

[52] U.S. Cl. .................................. 428/261; 156/150; 156/330; 252/511; 252/512; 252/513; 428/290; 428/349; 428/355; 428/356

[58] Field of Search ....................... 252/512, 513, 511; 156/330; 428/349, 355, 356, 416, 261, 290

[56] References Cited

U.S. PATENT DOCUMENTS

| | | | |
|---|---|---|---|
| 4,410,457 | 10/1983 | Fujimura et al. | 252/513 |
| 4,557,860 | 12/1985 | DiSalvo et al. | 252/513 |
| 4,575,432 | 3/1986 | Lin et al. | 252/513 |
| 4,581,281 | 4/1986 | Gerace | 428/355 |

FOREIGN PATENT DOCUMENTS

| | | | |
|---|---|---|---|
| 50-158624 | 12/1975 | Japan . | |
| 48311 | 11/1983 | Japan | 252/513 |
| 48509 | 9/1985 | Japan | 252/513 |

OTHER PUBLICATIONS

Chemical Abstracts 78:23883.

Primary Examiner—James C. Cannon
Attorney, Agent, or Firm—Armstrong, Nikaido, Marmelstein & Kubovcik

[57] ABSTRACT

Disclosed is an adhesive composition which contains (1) a polymer selected from acrylonitrile/butadiene copolymers, carboxyl group-containing acrylonitrile/butadiene copolymers, acrylic rubbers, urethane rubbers, chloroprene rubbers, chlorosulfonated polyethylene, ethylene/vinyl acetate copolymers, ethylene/acrylic acid or its ester or metal salt copolymers, ethylene/methacrylic acid ester or metal salt copolymers, thermoplastic polyurethanes, saturated polyesters and polyamides, (2) an epoxy acrylate resin, (3) an acrylic or methacrylic monomer having at least two different functional groups and/or an acrylic or methacrylic monomer of the formula:

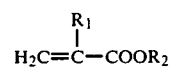

wherein $R_1$ is H or $CH_3$, and $R_2$ is ($C_1$-$C_{18}$) alkyl or an organic residue containing an aromatic hydrocarbon ring or a heterocyclic ring, (4) an organic peroxide and (5) an imidazole or an amino compound containing at least one tertiary amino group. The adhesive composition may further contain (6) a phosphorus-containing acrylate or methacrylate and/or a nitrogen-containing acrylate or methacrylate, and/or (7) an electroconductive material selected from carbon black having a surface area of 125 to 260 m$^2$/g and a DBP oil absorption of 100 to 200 cc/100 g, Ketjenblack, lamp black, acetylene black and graphite, and a cut carbon fiber and fine powders of aluminum, nickel, copper and zinc, having a size of not larger than 200 mesh. A structural adhesive is prepared by impregnating, spread-coating or laminating a strand mat, surface mat, cloth, nonwoven fabric or victoria lawn, composed of a glass fiber, a glass fiber/organic fiber composite, an organic fiber or a carbon fiber with the adhesive composition.

3 Claims, No Drawings

ADHESIVE COMPOSITION

BACKGROUND OF THE INVENTION (1) Field of the Invention

The present invention relates to a structural adhesive for use in bonding metals, paper, plastics and inorganic materials. More particularly, it relates to a structural adhesive having a good bonding property even to a surface on which a rust preventive oil or processing oil remains, the adhesive also having a high shearing force and a bonding force, and having an excellent flexural strength even after heating and curing. The adhesive also has an excellent rust preventive effect after bonding.

(2) Description of the Related Art

As known structural adhesives, there can be mentioned epoxy resin type adhesives, phenolic type adhesives, polyurethane type adhesives, structural acrylic adhesives and anaerobic structural adhesives. As the oil-absorbing adhesive capable of bonding to an oil-adhering metal surface, chloroprene type mastic adhesives having a non-volatile component content of at least 67% and vinyl chloride type mastic adhesives having a non-volatile component content of at least 92% are used. The adhesive power of these adhesives is low on an oily surface or, even if the adhesive bonds to the oily surface, the bonding strength is not as high as the bonding strength of the structural adhesive. Furthermore, polyurethane type adhesives, structural acrylic adhesives and anaerobic structural adhesives have a problem in that, when these adhesives are fixed to the surfaces of adherents or the bonded adherents are heated after fixation while being maintained in the vertical state, the adherents are readily moved out of position by a slight shock or vibration. Accordingly, it is necessary to secure the adherents by spot welding or clipping until a sufficient bonding strength is manifested.

Normal temperature curing type adhesives have been reported. For example, Japanese Unexamined Patent Publication No. 50-158624 discloses an adhesive composition comprising a liquid formed by incorporating a liquid chloroprene polymer with an epoxy resin and a liquid comprising a polyamide resin, a xylene resin being incorporated in at least one of the two liquids. However, this adhesive composition exhibits a poor bonding strength at elevated temperatures.

Polyurethane type adhesives are effective for bonding mortar, slate and plywood, but, when used for bonding metal adherents, the adhesives per se readily bubble due to the generation of carbon dioxide gas during the reaction of NCO groups and, therefore, the bonding strength is poor. In cyanoacrylate type adhesives, there is no substantial reduction of the bonding power at temperatures ranging from room temperature to about 90° C., but if the temperature exceeds this range, the bonding power is abruptly reduced and the resistance against peeling by bending is poor. Moreover, since the manufacturing cost is high, these adhesives have little general-purpose utility.

A structural adhesive having a low electric resistance has not been developed. Accordingly, when metal plates are bonded by using conventional structural adhesives and electrodeposition coating is carried out on the bonded metal plates, electrodeposition is possible only on the metal plates because they are electrically conductive, but since most of the structural adhesives have an electric resistance higher than $10^8$ $\Omega$-cm, no electric current flows through the adhesives or, if any electric current flows, the quantity is very small. Therefore, electrodeposition coating cannot be effected in the vicinity of the adhesives or in the bonding interfaces. Accordingly, the generation and growth of rust are readily caused at bonding points of the metals and in the vicinities thereof.

SUMMARY OF THE INVENTION

It is a primary object of the present invention to eliminate the foregoing defects of the conventional techniques and provide a structural adhesive for bonding metals to each other or a metal to paper, plastics or inorganic materials, which adhesive shows an excellent fixing property even if oil or the like remains on the surface of adherents and manifests a high bonding strength after curing and which prevents the formation of rust on the bonded surface.

Another object of the present invention is to provide an electrically conductive adhesive which has a low electric resistance and to which electrodeposition coating is possible, and which can, therefore, control the generation and growth of rust.

In accordance with one fundamental aspect of the present invention, there is provided an adhesive composition which comprises (1) at least one polymer having polar groups, which is selected from the group consisting of acrylonitrile/butadiene copolymers, carboxyl group-containing acrylonitrile/butadiene copolymers, acrylic rubbers, urethane rubbers, chloroprene rubbers, chlorosulfonated polyethylene, ethylene/vinyl acetate copolymers, ethylene/acrylic acid or its ester or metal salt copolymers, ethylene/methacrylic acid ester or metal salt copolymers, thermoplastic polyurethanes, saturated polyesters and nylons, (2) at least one epoxy acrylate resin, (3) an acrylic or methacrylic monomer having at least two different functional groups and/or an acrylic or methacrylic monomer represented by the following general formula:

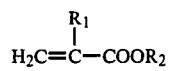

wherein $R_1$ is H or $CH_3$, and $R_2$ is an alkyl group having 1 to 18 carbon atoms or an organic residue containing an aromatic hydrocarbon ring or a heterocyclic ring, (4) an organic peroxide and (5) an imidazole or an amino compound containing at least one tertiary amino group. This adhesive composition may further comprise, as an optional component, (6) at least one member selected from the group consisting of mono(2-methacryloyloxyethyl) acid phosphate, mono(2-acryloyloxyethyl) acid phosphate and nitrogen-containing acrylates and methacrylates.

In accordance with another aspect of the present invention, there is provided a structural adhesive obtained by impregnating, spread-coating or laminating a strand mat, surface mat, cloth, nonwoven fabric or victoria lawn composed of a glass fiber, a glass fiber/organic fiber composite, an organic fiber or a carbon fiber with an adhesive composition comprising the above-mentioned components (1) through (5) and optionally the component (6).

In accordance with still another aspect of the present invention, there is provided an electrically conductive adhesive composition which comprises the above-mentioned components (1) through (5), optionally the component (6), and (7) at least one member selected from carbon black having a surface area of 125 to 260 m²/g as determined by the N₂ adsorption method and DBP oil absorption of 100 to 200 cc/100 g, Ketjenblack, lamp black, acetylene black and graphite and/or at least one member selected from a cut carbon fiber and fine powders of aluminum, nickel, copper and zinc having a size not larger than 200 mesh.

In accordance with still another aspect of the present invention, there is provided an electrically conductive adhesive obtained by impregnating, spread-coating or laminating a strand mat, surface mat, cloth, nonwoven fabric or victoria lawn composed of a glass fiber, a glass fiber/organic fiber composite, an organic fiber or a carbon fiber with an adhesive composition comprising the above-mentioned components (1) through (5), optionally the component (6), and the component (7).

DESCRIPTION OF THE PREFERRED EMBODIMENTS

The polymer used as the component (1) in the present invention has a relatively high polarity and has a compatibility with reactive oligomers or monomers used in the components (2), (3) and (6), and a polymer having a certain oil resistance, that is, a polymer which is not swollen or only slightly swollen with an oil, is preferred. Accordingly, as the elastomer that can used, there are mentioned acylonitrile/butadiene copolymers (NBR), acrylic rubbers, chloroprene rubbers, hydrine rubbers, chlorosulfonated polyethylene, ethylene/vinyl acetate copolymers, ethylene/acrylic acid copolymers, ehtylene/acrylic acid ester copolymers, ethylene/methacrylic acid copolymers, ethylene/metal acrylate copolymers, ethylene/metal methacrylate copolymers, thermoplastic urethane rubbers, saturated polyesters and polyamides. These polymers give the adhesive a filmy or sheet-like shape-retainability, give toughness to the adhesive per se after curing, and impart flexural and peel strengths to bonded composites.

A polymer having carboxyl group at the terminal or in the molecule is preferred as the component (1). For example, Nipol 1072 (supplied by Nippon Zeon Co.) and Hycar CTBN 1300X13 (supplied by Goodrich Chemical Co.), which contain a carboxyl group, are mentioned as NBR. By using polymers of this type singly or in the form of a blend with other polymers, the modulus, toughness and compatibility are appropriately improved and a good balance is maintained in the properties in the entire system of the adhesive.

The epoxy acrylate resin used as the component (2) is selected from resins having terminal acrylic or methacrylic groups, which are obtained by modifying various epoxy resins such as bisphenol A type epoxy resins, bisphenol F type epoxy resins, polyphenol type epoxy resins, halogenated bisphenol type epoxy resins, polyhydric glycidyl ester type epoxy resins and peracetate oxidized type epoxy resins with acrylic acid or methacrylic acid. The terminal acrylic or methacrylic groups of the component (2) are polymerized and crosslinked with an organic peroxide, ultraviolet rays or electron beams. The component (2) is a so-called oligomer which is neither an elastomer nor a monomer and is a solid or highly viscous liquid. Before the reaction, the component (2) has appropriate hardness and stickiness at room temperature and prevents sagging of the adhesive on the bonding surface, and when it is heated, it gives an appropriate tackiness to the adhesive. Since the component (2) has ordinarily at least two functional groups, it is effective for crosslinking and is valuable for increasing the modulus of the adhesive.

The molecular weight of the component (2) is preferably 200 to 4000, and the component (2) is incorporated preferably in an amount of 20 to 200 parts by weight per 100 parts by weight of the polar polymer (1). If the amount of the incorporated component (2) is smaller than 20 parts by weight per 100 parts by weight of the component (1), the modulus is reduced. If the amount of the component (2) is larger than 200 parts by weight per 100 parts by weight of the component (1), the adhesive becomes too hard and the bonding force against peeling or bending is reduced.

In the present invention, an acrylic or methacrylic monomer having at least two different functional groups and/or an acrylic or methacrylic monomer represented by the following general formula:

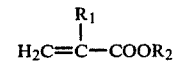

wherein $R_1$ is H or $CH_3$, and $R_2$ is an alkyl group having 1 to 18 carbon atoms or an organic residue containing an aromatic hydrocarbon ring or heterocyclic ring, is used as the component (3).

The acrylic or methacrylic monomer having at least two different functional groups increases the cross-linking density of the adhesive and the modulus thereof and has a good wettability with the bonding interface. Especially, this monomer dissolves or disperses therein oils in various surface conditions and yields a cured polymer having an oil resistance. This component (3) is characteristic over the epoxy acrylate resin as the component (2) in that the molecular portions between the telechelic acrylic or methacrylic groups are aliphatic and the component (3) is substantially liquid.

As the acrylic and methacrylic monomer used as the component (3), there can be mentioned ethylene glycol diacrylate, ethylene glycol dimethacrylate, diethylene glycol diacrylate, diethylene glycol dimethacrylate, triethylene glycol diacrylate, triethylene glycol dimethacrylate, 1,3-butylene glycol diacrylate, 1,3-butylene glycol dimethacrylate, 1,4-butylene glycol dimethacrylate, 1,6-hexane glycol diacrylate, 1,6-hexane glycol dimethacrylate, neopentyl glycol diacrylate, neopentyl glycol dimethacrylate, trimethylol propane triacrylate, trimethylol propane trimethacrylate, trimethylol ethane triacrylate, trimethylol ethane trimethacrylate, tetramethylol methane triacrylate, tetramethylol methane tetraacrylate, glycidyl acrylate, glycidyl methacrylate, 2-hydroxyethyl acrylate and 2-hydroxyethyl methacrylate.

It is preferred that the above-mentioned component (3) be incorporated in an amount of 5 to 70 parts by weight per 100 parts by weight of the elastomer (1). If the component (3) is incorporated in an amount larger than 70 parts by weight per 100 parts by weight of the component (1), the adhesive becomes too hard and has a poor toughness, and the flexural, peel and impact strengths are reduced. If the amount of the component (3) is smaller than 5 parts by weight per 100 parts by weight of the component (1), the plasticizing effect is low, no effect is exerted on oils, and the crosslinking density is low.

As the component (3), there can also be used an acrylic or methacrylic monomer represented by the following general formula:

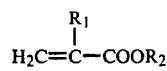

wherein $R_1$ is H or $CH_3$, and $R_2$ is an alkyl group having 1 to 18 carbon atoms or an organic residue containing an aromatic hydrocarbon ring or heterocylic ring. This monomer is polymerized by a peroxide to increase the molecular weight. In addition to this polymerizing function, this monomer, as well as the above-mentioned acrylic or methacrylic monomer having different functional groups, exerts functions of showing a good wettability with the bonding interface, dissolving and dispersing therein oils in various surface conditions, appropriately swelling the polymer and facilitating the reaction of the oligomer or this monomer per se in the polymer. The monomer wets the surface of the adhesive while swelling the polymer, and is effective for manifesting tackiness. Moreover, the acrylic or methacrylic polymer formed from this monomer has an excellent oil resistance and hence is little swollen or softened by an oil. Note, when a step such as high-temperature curing is included, an acrylic monomer having a low vapor pressure is used. For example, when the adhesive is passed through a baking step at 200° C., if the vapor pressure of the acrylic monomer is higher than 100 mmHg at 200° C., bubbling is caused at the curing step. If bubbling occurs in the adhesive before the curing is completed, the bonding strength is reduced. As examples of the acrylic and mahacrylic monomers used in the present invention, there can be mentioned $C_1$-$C_4$-alkoxyethyl acrylate, $C_1$-$C_4$-alkoxyethyl methacrylate, methoxyethoxyethyl acrylate, methoxyethoxyethyl methacrylate, benzyl acrylate, benzyl methacrylate, phenoxyethylacrylate, phenoxyethyl methacrylate and tetrahydrofurfuryl acrylate. These monomers may be used alone or in combination.

It is preferred that the monomer of the above general formula as the component (3) be incorporated in an amount of 3 to 20 parts by weight per 100 parts by weight of the component (1). If the amount of this monomer is larger than 20 parts by weight per 100 parts by weight of the component (1), shrinkage at the time of curing is too large or the adhesive becomes hard, the distortion of the bonded adherent is large and warping or sinking occurs.

The phosphorus-containing acrylate or methacrylate and/or the nitrogen-containing acrylate or methacrylate used optionally as the component (6) in the present invention are effective for bonding to the metal surface or attaining the rust-preventing effect after bonding. Furthermore, the monomer of this type is effective against oils and is included into the polymer by heat-curing to give a cured adhesive that is not swollen with an oil or the like. As the monomer of this type, there are preferably used mono(2-methacryloyloxyethyl) acid phosphate, bis(2-methacryloyloxyethyl) acid phosphate, mono(2-acryloyloxyethyl) acid phosphate, bis(2-acryloyloxyethyl) acid phosphate, dimethylaminoethyl acrylate, dimethylamino ethyl emthacrylate, diethylaminoethyl acrylate, diethylaminoethyl methacrylate, 2-aminoethyl vinyl ether, t-butylaminoethyl acrylate, morpholinoethyl acrylate and morpholinoethyl methacrylate.

In the present invention, this component (6) is not an indispensable component, but in order to improve the bonding to the metal surface and the rust-preventing effect after bonding, it is preferred that the component (6) be incorporated. The amount incorporated of the component (6) is up to 10 parts by weight, preferably 1 to 10 parts by weight, per 100 parts by weight of the polymer as the component (1). Even if the component (6) is incorporated in an amount exceeding 10 parts by weight per 100 parts by weight of the component (1), no substantial increase of the effect by incorporation of the component (6) is attained but by copolymerization, the crosslinking density becomes too high and the adhesive becomes brittle.

In the present invention, in order to provide an adhesive having a reduced electrical insulating property, at least one member selected from carbon black having a surface area of 125 to 260 m$^2$/g as determined by the $N_2$ adsorption method and a DBP oil absorption of 100 to 200 cc/100 g, Ketjenblack, lamp black, acetylene black and graphite and/or at least one member selected from a cut carbon fiber and fine powders of aluminum, nickel, copper and zinc having a size smaller than 200 mesh is incorporated as the component (7).

The component (7) is mixed with the polymer (1) in advance and then mixed with various monomers and oligomers. Note, if the carbon fiber is used in the form of a cloth or a mat, different processing methods are adopted. It is preferred that the component (7) be used in an amount of 10 to 150 parts by weight per 100 parts by weight of the polymer as the component (1). When the electrically conductive powder is not incorporated, the volume resistivity of the adhesive composition is about $10^{10}$ to about $10^{13}$ Ω-cm, and the adhesive composition is almost insulative. When metals are combined in vehicles, electric appliances and construction materials, since these ordinarily adopt bolt-fixing and welding methods using metals, electric conduction can be attained between portions in contact with each other. However, when an organic adhesive is used, since the organic material is generally electrically insulating, upon electrodeposition coating, the adhesive-applied portion is not coated. This disadvantage is eliminated by incorporation of the component (7) in the adhesive. It is known that, in view of the field intensity at the electrodeposition coating, it is sufficient if the insulating property is such that the resistance value is about $15^5$ Ω-cm or smaller.

In the adhesive of the present invention, the components (2), (3) and (6), each having a double bond, is mixed with the polar polymer as the component (1), and then, the organic peroxide as the component (4) is added to the mixture. By effecting copolymerization or crosslinking by ordinary heating or induction heating using electron beams or electromagnetic waves, bonding is accomplished, and an organic peroxide to be used is appropriately selected according to heating conditions. As the organic peroxide, there can be mentioned ketone type peroxides, diacyl peroxides, hydroperoxides, dialkyl peroxides, peroxyketals, alkyl peresters, percarbonates and silane-containing peroxides.

The amount of the organic peroxide is preferably 0.1 to 10 parts by weight, more preferably 1 to 5 parts by weight, based on 100 parts by weight of the polymer component (1).

When the above-mentioned peroxide is added, a small amount of an imidazole or an amino compound containing at least one tertiary amino group is added as the component (5) of the present invention. As the component (5), there can be mentioned Imidazole 2P4MZ (tradename, 2-phenyl-4-methylimidazole), Imidazole C17Z (tradename, 2-heptadecylimidazole), DMP-10 (tradename, 2-(dimethylaminomethyl) phenol), DMP-30 (tradename, 2,4,6-tris(dimethylaminomethyl)-phenol), DBU (1,8-Diaza-bicyclo(5,4,0) undecene-7,

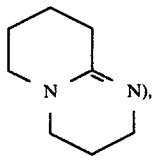

triethylene diamine and tetramethylene pentamine. If a compound of this type contains a glycidyl group as one of the functional groups, the compound acts also as a curing catalyst and hence, this compound is preferred. The component (5) is incorporated in an amount corresponding to 1/3 to 1/20 of the amount of the peroxide (4).

The structural adhesive of the present invention is obtained by impregnating, spread-coating or laminating a strand mat, surface mat, cloth, nonwoven fabric or victoria lawn which is composed of a glass fiber, a glass fiber/organic fiber composite, an organic fiber or a carbon fiber, with an adhesive composition comprising the above-mentioned components. When a cloth or nonwoven fabric is used, the strength of the sheet-like or film adhesive per se is improved and attachment or handling of adherents can be facilitated, and furthermore, the thickness of the adhesive layer is advantageously kept uniform. In addition, this cloth or nonwoven fabric is highly effective for improving the shear strength or peeling force and a well-balanced bonding force can be manifested. The texture of the cloth is not particularly critical, and any of plain weave, narrowed plain weave, satin weave and twill weave can be used. As the material of the cloth, there can be used glass, polyesters, nylons and vinylon, and mixtures thereof. A strand mat of glass is especially preferred because the entire surface is uniformly impregnated with the adhesive, and in view of the manufacturing cost, the strand mat of glass is advantageous over the above-mentioned cloth. A chopped strand mat or roving mat also is preferably used.

According to the present invention, by combination and integration of the above-mentioned components, there can be provided an adhesive which manifests an initial tackiness and has an excellent toughness, an appropriate modulus and a high rust-preventing effect.

As is apparent from the foregoing description, the adhesive composition of the present invention comprising the above-mentioned components (1) through (5) is sufficiently fixed to a wet surface, especially an oily surface, of a steel plate or the like without any washing or cleaning treatment, and manifests a strong bondability by heating and curing. If the component (6) is further incorporated, the bonding to a metal is enhanced and the rust-preventing effect after bonding is also enhanced. If the component (7) is further added, the electric resistance is reduced, and the electrodeposition coating can be advantageously performed without coating unevenness. Therefore, excellent rust-prevention on the adhered surface of a metal article can be attained.

Moreover, the structural adhesive of the present invention obtained by impregnating, spread-coating or laminating a strand mat, cloth, nonwvoven fabric or the like composed of a glass fiber, a glass fiber/organic fiber composite, an organic fiber or a carbon fiber with the above-mentioned adhesive composition can be sufficiently fixed to adherends such as steel plates, especially oil-adhering metals, plastics and fiber-reinforced plastic, without any washing or cleaning treatment, and manifests a strong bondability by heating and curing. Moreover, this structural adhesive is advantageous in that bonding is possible without any cleaning treatment or after a simple treatment.

The structural adhesive of the present invention is generally used as a steel plate-reinforcing adhesive, an adhesive for forming a honeycom structure of a metal, plastics or paper and an adhesive for bonding same materials, such as metals, to each other, or bonding different materials, such as a metal and a plastic material, to each other. Accordingly, the structural adhesive of the present invention can be widely used in various fields for vehicles, ships, household and industrial electric appliances, construction materials, engineering construction, ordinary utensils and the like.

The present invention will now be described in detail with reference to the following examples and comparative examples. Note, in tables given in the examples and comparative examples, all of "parts" are by weight.

The properties of adhesives were determined according to the following methods.

Oil Surface-Fixing Property

A JIS steel plate which had not been surface-treated was immersed in a rust-preventive oil (Metal Guard 831) and was hung vertically for 24 hours. A sheet-like adhesive sample was interposed between two steel plates to lightly compress the adhesive sample in the state where the oil was thinly left on the surface, and the oily surface-fixing property of the thus-formed test piece was examined.

Slipping at Heating

The test piece obtained by interposing and lightly compressing the sheet-like adhesive between two metal sheets in the above-mentioned manner was vertically hung in an oven maintained at 80° C. for 30 minutes, and slipping upon heating was evaluated.

Bonding Force

The same test piece as used for evaluation of slipping at heating was heated at 215° C. for 30 minutes and the bonding forces (tensile shear strength, T-peel strength and flexural strength) were measured according to JIS K-6850.

EXAMPLES 1 THROUGH 14

Components shown in Table 1 or 2 were used in amounts shown in Table 1 or 2. Components except an organic peroxide as the component (4) and an imidazole or tertiary amino group-containing amino compound as the component (5) were mixed together on a mill, and then the components (4) and (5) were incorporated into the mixture under cooling. Then, the mixture was formed into a sheet having a thickness of 0.6 to 0.8 mm.

TABLE 1

| Component No. | Composition (parts) | | Example No. 1 | 2 | 3 | 4 | 5 | 6 | 7 |
|---|---|---|---|---|---|---|---|---|---|
| (1) | Carboxyl group-containing NBR (NBR-1072) | | 100 | 100 | 100 | 100 | | | |
|  | Acrylic rubber (AR-31) | | | | | | 100 | 100 | 100 |
| (2) | Epoxy acrylate resin | (I)*1 | 100 | 100 | 90 | 50 | 80 | | 100 |
|  |  | (II)*2 | 65 | | | 70 | | 60 | |
|  |  | (III)*3 | | | 70 | | 100 | 40 | |
|  | n-Butyl acrylate | | | 5 | | | | 10 | |
|  | Tetrahydrofurfuryl methacrylate | | | | 10 | | 20 | | |
|  | 2-Ethylhexyl methacrylate | | | | | 20 | | 5 | |
| (3) | Trimethylol propane trimethacrylate | | | | | | | 10 | 10 |
|  | 1,4-Butanediol acrylate | | | | | 5 | 5 | | |
|  | Glycidyl methacrylate | | 50 | 60 | 50 | 70 | 60 | 40 | 50 |
| (6) | Mono (2-methacryloyloxy-ethyl) acid phosphate | | 15 | 15 | | 10 | | 5 | 5 |
|  | Dimethylaminoethyl methacrylate | | | | | 5 | | 3 | |
| (4) | t-Butyl peroxide | | 1.8 | | | | | | |
|  | t-Butyl perbenzoate | | | 2 | 2 | | | 2 | 2 |
|  | 2,2-Di(t-butylperoxy)butane | | | | | 2 | 2 | | |
| (5) | Imidazole 2P4MZ*10 | | 2 | 1.8 | 1.8 | 1.8 | 1.8 | | |
|  | DMP-30*11 | | | | | | | 2 | 2 |
| Properties | | | | | | | | | |
| Oily face-fixing property | | | Good | Good | Good | Good | Good | Good | Good |
| Slipping upon heating at 80° C. for 30 min. | | | No | No | No | No | No | No | No |
| Bonding force | | | | | | | | | |
| (Tensile shear strength) kg/cm² | | | 240 | 220 | 200 | 190 | 180 | 200 | 170 |
| (T-peel strength) kg/25 mm | | | 15 | 12 | 13 | 14 | 13 | 13 | 14 |
| (Flexural strength) kg (heated in oven at 215° C. for 30 min.) | | | 19 | 17 | 17 | 18 | 17 | 17 | 17 |

TABLE 2

| Component No. | Composition (parts) | Example No. 8 | 9 | 10 | 11 | 12 | 13 | 14 |
|---|---|---|---|---|---|---|---|---|
| (1) | Ethylene/vinyl acetate copolymer*4 | 100 | | | | | | |
|  | Ethylene/acrylic acid copolymer | | 100 | | | | | |
|  | Thermoplastic polyurethane*5 | | | 100 | | | | |
|  | Chlorosulfonated polyethylene*6 | | | | 100 | | | |
|  | Chloroprene*7 | | | | | 100 | | |
|  | Santurated polyester*8 | | | | | | 100 | |
|  | Nylon*9 | | | | | | | 100 |
| (2) | Epoxy acrylate resin*1 | 120 | 120 | 120 | 120 | 120 | 120 | 120 |
| (3) | Glycidyl methacrylate | 50 | 50 | 50 | 50 | 50 | 50 | 50 |
| (4) | t-Butyl perbenzoate | 2 | 2 | 2 | 2 | 3 | 2 | 2 |
|  | Zinc oxide | | | | | 5 | 5 | |
| (5) | Imidazole 2P4MZ*10 | 1.8 | 1.8 | 1.8 | 2 | 2 | 1.8 | 1.8 |
| Properties | | | | | | | | |
| Oily surface-fixing property | | Good | Good | Good | Good | Good | Good | Good |
| Slipping upon heating at 80° C. for 30 min. | | No | No | No | No | No | No | No |
| Bonding force | | | | | | | | |
| (Tensile shear strength) kg/cm² | | 180 | 210 | 230 | 170 | 180 | 210 | 240 |
| (T-peel strength) kg/25 mm | | 14 | 15 | 17 | 12 | 12 | 13 | 15 |
| (Flexural strength) kg | | 18 | 19 | 19 | 17 | 17 | 17 | 18 |

Note
*1 product formed by adding methacryloyl groups to both ends of bisphenol A diglycidyl ether
*2 Product formed by adding methacryloyl groups to both ends of Epikote 1001
*3 product formed by adding methacryloyl groups to both ends of Epikote 834
*4 vinyl acetate content of 33% by weight
*5 ester type thermoplastic polyurethane (marketed under tradename of "Pandex T-5205" by Dainippon Ink and Chemicals, Inc.)
*6 Hypalon 40 supplied by Du Pont Co.
*7 W type
*8 Vylon supplied by Toyobo Co.
*9 copolymer of nylon 6, nylon 66 and nylon 6, 10
*10 2-phenyl-4-methylimidazole
*11 2,4,6-tris(dimethylaminomethyl)phenol As seen from the results shown in Tables 1 and 2, each of the adhesive compositions of Examples 1 through 14 comprising the components (1) through (5) and optionally together with the component (6), has a high bondability and a good oily surface-fixing property and does not cause slipping of adherents upon heating.

EXAMPLE 15

In a mill were mixed 100 parts of a carboxyl group-containing acrylonitrile/butadiene copolymer (Nipol 1072 supplied by Nippon Zeon Co.), as the component (1), 100 parts of a bisphenol-based epoxy acrylate resin and 65 parts by weight of an epoxy acrylate formed by adding emthacrylic acid to the ends of a high-molecular-weight bisphenol A type epoxy resin (Epikote 1001 supplied by Shell Chemical Co.) as the component (2), 50 parts by weight of glycidyl methacrylate as the component (3) and 15 parts by weight of mono(2-acryloyloxyethyl) acid phosphate as the component (6). Thereafter, 2 parts by weight of Imidazole 2P4MHZ as the component (5) and 1.8 parts by weight of t-butyl peroxide as the component (4) were added to the resulting mixture while cooling to form a composition. This composition was coated on a glass chopped strand mat having a width of 310 mm and a unit weight of 300 g/m² by a sheeting machine. The necessary thickness was obtained by piling the formed sheets according to the amount of the composition coated and the unit weight of the strand mat used. Thus, a sheet-like structural adhesive having a thickness of 0.8 mm was prepared. Slipping upon heating was not observed in case of the thus-obtained sheet-like structural adhesive, and the excellent bonding force was such that the tensile shear strength was 220 kg/cm² and the peel strength (90° peel) was 22 kg/25 mm of the width.

EXAMPLES 16 THROUGH 25

The tensile shear strength of the sheet-like structural adhesive prepared in Example 15 was measured by using various oils shown in Table 3. The obtained results, together with the value obtained in Example 15, are shown in Table 3.

TABLE 3

| Example No. | Oil | Bonding force (tensile shear strength) (kg) | Note |
|---|---|---|---|
| 15 | Metal guard 831 | 190 | Metal working oil |
| 16 | Vacuoline | 200 | Lubricating oil for sliding faces supplied by Mobil Petroleum |
| 17 | DTE 24 | 230 | Lubricating oil for rotary parts |
| 18 | DTE 26 | 210 | " |
| 19 | DTE B3 | 185 | " |
| 20 | Molub gear 634 | 200 | Lubricating oil for gears |
| 21 | Molub gear +140 | 180 | " |
| 22 | Molub gear 300S | 180 | " |
| 23 | Sultran B-3 | 210 | Metal working oil for ordinary cutting supplied by Mobil Petroleum |
| 24 | Normal oil | 250 | Metal working oil for finishing |
| 25 | Toshiba silicone TSH | 180 | General purpose silicone oil |

As apparent from the data shown in Table 3, when the adhesive of the present invention is used, a preferred bonding force is obtained irrespective of the kind of the oil on a steel plate.

EXAMPLES 26 THROUGH 32

Sheet-like structural adhesives having a thickness shown in Table 5 were obtained by coating compositions A through F shown in Table 4 on a chopped strand mat, a surface mat, a glass cloth, a nonwoven fabric or a victoria lawn as shown in Table 5. The properties of these structural adhesives are shown in Table 5.

TABLE 4

| Component No. | Composition (parts) | A | B | C | D | E | F |
|---|---|---|---|---|---|---|---|
| (1) | NBR*¹ | 100 | | | | 100 | |
| | Acrylic rubber AR31 | | 100 | | | | |
| | Ethylene/acrylate copolymer | | | 100 | | | |
| | Saturated polyester*² | | | | 100 | | |
| | Nylon | | | | | | 100 |
| (2) | Epoxy acrylate resin I*³ | 100 | 120 | 100 | 100 | 100 | 100 |
| | Epoxy acrylate resin II*⁴ | 40 | 30 | 50 | 60 | 50 | 50 |
| (3) | Glycidyl methacrylate | 60 | 60 | 60 | 60 | 60 | 60 |
| (6) | Mono(2-acryloyloxyethyl) acid phosphate | 10 | 15 | 15 | 15 | 15 | 15 |
| (4) | t-Butyl perbenzoate | 2.5 | 3.0 | 3.0 | 3.0 | 2.0 | 2.0 |
| (5) | DMP-30*⁵ | 2.0 | 2.0 | 2.0 | 2.0 | 2.0 | 2.0 |

Note
*¹Nipol 1072 supplied by Nippon Zeon Co.
*²marketed under the tradename of "Vylon"
*³bisphenol A-based epoxy acrylate resin
*⁴epoxy acrylate resin formed by adding methacrylic acid to the ends of epoxy resin of bisphenol A type having high molecular weight
*⁵2,4,6-tris(dimethylaminomethyl)phenol

TABLE 5

| Example No. | 26 | 27 | 28 | 29 | 30 | 31 | 32 |
|---|---|---|---|---|---|---|---|
| Composition | A | A | B | C | D | E | F |
| Chopped strand mat*⁵ | o | | o | | | | |
| Surface mat*⁶ | | o | | | | | |
| Glass cloth*⁷ | | | | o | | | |
| Nonwoven fabric*⁸ | | | | | o | | |
| Victoria lawn*⁹ | | | | | | o | |
| Victoria lawn*¹⁰ | | | | | | | o |
| Properties | | | | | | | |
| Oily surface-fixing property | Good | Good | Good | Good | Good | Good | Good |
| Slipping upon heating at 80° C. | No | No | No | No | No | No | No |

TABLE 5-continued

| Example No. | 26 | 27 | 28 | 29 | 30 | 31 | 32 |
|---|---|---|---|---|---|---|---|
| Composition | A | A | B | C | D | E | F |
| for 30 min. | | | | | | | |
| Bonding force | | | | | | | |
| Tensile shear strength (kg/cm$^2$) | 180 | 200 | 190 | 170 | 160 | 150 | 170 |
| T-peel strength (kg/25 mm) | 25 | 24 | 26 | 22 | 18 | 18 | 19 |
| Flexural strength (kg) | 18 | 18 | 19 | 18 | 17 | 17 | 17 |
| Thickness of adhesive (mm) | 1.0 | 1.0 | 1.0 | 0.8 | 0.8 | 0.7 | 1.0 |

Note
*[5]"CM 300" supplied by Asahi Fiber Glass Co., basis weight = 300 g/m$^2$
*[6]"SM 3605" supplied by Asahi Fiber Glass Co., thickness = 0.64 mm, basis weight = 100 g/m$^2$
*[7]"MG 130" supplied by Asahi Fiber Glass Co., thickness = 0.13 mm, density 19/19 (filaments/25 mm)
*[8]polyester, "B504-10" supplied by Toray Ind. Inc., thickness = 0.20 mm, basis weight = 40 g/m$^2$
*[9]polyester, "T-100" supplied by Teijin Ltd.
*[10]vinylon #510 supplied by Unitika Ltd., LSF = 30 × 30, density = 15 × 15

EXAMPLE 33 AND COMPARATIVE EXAMPLE 1

Materials other than steel plates were bonded by the adhesive used in Example 15, and the bonding force (tensile shear strength) was measured to obtain results shown in Table 6. Stainless steel, brass and aluminum were used as the adherents. For comparison, a commercially available epoxy type adhesive was used and the bonding force was measured.

TABLE 6

| Adherents | Example 33 | Comparative Example 1* |
|---|---|---|
| Stainless steel plates | 170 kg/cm$^2$ | 50 kg/cm$^2$ |
| Brass plates | 80 kg/cm$^2$ | 20 kg/cm$^2$ |
| Aluminum plates | 100 kg/cm$^2$ | 30 kg/cm$^2$ |

Note
*commercially available epoxy type adhesive

From the results shown in Table 6, it is seen that the adhesive of the present invention shows an excellent bonding strength even in the case of a special material or part where bonding is impossible by ordinary adhesives unless a special preliminary treatment is carried out.

EXAMPLE 34

Sheets of FRP (epoxy resin/glass fiber) having a length of 100 mm, a width of 25 mm and a thickness of 2 mm were bonded together without any particular preliminary treatment by using an adhesive composition which was the same as the adhesive composition of Example 15 except that benzoyl peroxide was added instead of t-butyl perbenzoate. Heating was conducted at 60° C. for 40 minutes because FRP became soft at a higher temperature, and the tensile shear strength and flexural strength were measured. The tensile shear strength was higher than 150 kg/cm$^2$ and the state of the material fracture was substantially brought about. The flexural strength was higher than 18 kg. No peeling was caused and FRP whitened.

EXAMPLE 35

In a mill were mixed 100 parts by weight of an acrylic rubber (Nipol AR-31 supplied by Nippon Zeon Co.) as the component (1), 100 parts by weight of a bisphenol-based epoxy acrylate resin and 60 parts by weight of an epoxy acrylate formed by adding methacrylic acid to the ends of a high-molecular-weight bisphenol A type epoxy resin (Epikote 1001 supplied by Shell Chemical Co.) as the component (2), 50 parts by weight of glycidyl methacrylate as the component (3) and 30 parts by weight of tetrahydrofurfuryl acrylate as the optional component. Then, 2 parts by weight of Imidazole 2P4MZ (2-phenyl-4-methylimidazole) as the component (5) and 1.8 parts by weight of t-butyl peroxide as the component (4) were added to the resulting mixture under cooling to form an adhesive composition. The adhesive composition was coated n a chopped strand mat having a width of 310 mm and a unit weight of 300 g/m$^2$ by a sheeting machine. The necessary thickness was obtained by piling the coated sheets according to the amount of the adhesive composition coated and the unit weight of the strand mat. Thus, a sheet-like structural adhesive having a thickness of 1.2 mm was obtained.

This structural adhesive showed tensile shear strength of 190 kg/cm$^2$ and a T-peel strength of 21 kg/25 mm of the width.

EXAMPLES 36 THROUGH 44

Components shown in Table 7, except t-butyl perbenzoate, were kneaded by a pressure kneader, and t-butyl perbenzoate was incorporated into the mixture in a cooling mill so that heat was not generated, whereby an adhesive composition was prepared.

The thus-prepared adhesive composition was coated on a carbon fiber strand mat having a width of 310 mm and a unit weight of 300 g/m$^2$ by a sheeting machine. The necessary thickness was obtained by piling the coated sheets according to the amount of the composition coated and the unit weight of the strand mat used. Thus, sheet-like electrically conductive adhesives (Examples 36 through 44) having a thickness of 1 mm were prepared.

With respect to each of these sheet-like adhesives, slipping upon heating was not caused. The bonding force and the volume resistivity (Ω-cm at 23° C.) of each adhesive are shown in Table 7.

When the sheet-like electrically conductive adhesive was subjected to electrodeposition coating before heating, the steel plate surface and the interface between the steel plate and the adhesive were uniformly coated. At the salt spray test, generation and growth of rust were very slow.

TABLE 7

| Component | | Example No. | | | | | | | | |
|---|---|---|---|---|---|---|---|---|---|---|
| No. | Composition (parts) | 36 | 37 | 38 | 39 | 40 | 41 | 42 | 43 | 44 |
| (1) | NBR*[1] | 100 | 100 | 100 | 100 | 100 | 100 | 100 | 100 | 100 |

TABLE 7-continued

| Component | | Example No. | | | | | | | | |
|---|---|---|---|---|---|---|---|---|---|---|
| No. | Composition (parts) | 36 | 37 | 38 | 39 | 40 | 41 | 42 | 43 | 44 |
| (2) | Epoxy acrylate resin I*[2] | 100 | 100 | 100 | 100 | 100 | 100 | 100 | 100 | 100 |
|  | Epoxy acrylate resin II*[3] | 65 | 65 | 65 | 65 | 65 | 65 | 65 | 65 | 65 |
| (3) | Glycidyl methacrylate | 50 | 50 | 50 | 50 | 50 | 50 | 50 | 50 | 50 |
| (6) | Ketjenblack*[4] | 30 | | | | | | | | |
|  | Acetylene black | | 40 | | | | 30 | | | |
|  | Lamp. black | | | 40 | | | | | | |
|  | Electroconductive carbon A*[5] | | | | 40 | | | 30 | | |
|  | Electroconductive carbon B*[6] | | | | | 40 | | | | |
|  | Electroconductive carbon C*[7] | | | | | | | | 40 | |
|  | Carbon black HAF (N330)*[8] | | | | | | | | | 40 |
| (4) | t-Butyl perbenzoate | 1.8 | 1.8 | 1.8 | 1.8 | 1.8 | 1.8 | 1.8 | 1.8 | 1.8 |
| (5) | Imidazole 2P4MZ*[9] | 2 | 2 | 2 | 2 | 2 | 2 | 2 | 2 | 2 |
| Properties | | | | | | | | | | |
| Volume resistivity ($\Omega$-cm, 23° C.) | | $2.4 \times 10^5$ | $6.8 \times 10^4$ | $7.7 \times 10^4$ | $1.0 \times 10^5$ | $9.3 \times 10^4$ | $3.4 \times 10^5$ | $4.7 \times 10^5$ | $7.2 \times 10^5$ | $3.3 \times 10^5$ |
| Bonding force | | | | | | | | | | |
| Tensile shear strength (kg/cm$^2$) | | 190 | 177 | 182 | 173 | 190 | 196 | 187 | — | — |
| T-peel strength (kg/25 mm of width) | | 20 | 18 | 17 | 17 | 17 | 20 | 20 | — | — |

Note
*[1]Nipol 1072 supplied by Nippon Zeon Co.
*[2]bisphenol A-based epoxy acrylate resin
*[3]epoxy acrylate resin obtained by adding methacrylic acid to the ends of high-molecular-weight bisphenol A type epoxy resin
*[4]Ketjenblack EC supplied by Lion-Akzo Co.
*[5]Vulcan XC-72 supplied by Cabot Corp., N$_2$ surface area = 254 m$^2$/g, DBP oil absorption = 178 cc/100 g, bulk specific gravity = 264 kg/m$^3$
*[6]Black Pearl 700 supplied by Cabot Corp., N$_2$ surface area = 200 m$^2$/g, DBP oil absorption = 115 cc/100 g, bulk specific gravity = 336 kg/m$^3$
*[7]Vulcan C supplied by Cabot Corp., N$_2$ surface area = 125 m$^2$/g, DBP oil absorption = 100 cc/100 g, bulk specific gravity = 376 kg/m$^3$
*[8]N$_2$ surface area = 83 m$^2$/g, DBP oil absorption = 102 cc/100 g, bulk specific gravity = 375 kg/m$^3$
*[9]2-phenyl-4-methylimidazole As is seen from the results shown in Table 7, each of the adhesives of Examples 36 through 44 according to the present invention has a good bonding force even if an oil adheres to a steel surface. The volume resistivity of each of the adhesives of Examples 36 through 43 is lower than that of the adhesive of Example 44 comprising Carbon Black HAF.

EXAMPLES 45 THROUGH 47

Adhesive compositions shown in Table 8, which were prepared in the same manner as in Example 36, were coated on carbon cloth, glass mat and glass sheet shown in Table 8 to obtain sheet-like electrically conductive adhesives having a thickness of 1.1 mm. With respect to each of the thus-prepared electrically conductive adhesives, the volume resistivity and bonding force were measured, and the electrodeposition property at the electrodeposition coating step was evaluated. The obtained results are shown in Table 8.

TABLE 8

| Component | | Example No. | | |
|---|---|---|---|---|
| No. | Composition (parts) | 45 | 46 | 47 |
| (1) | NBR*[1] | 100 | 100 | 100 |
| (2) | Epoxy acrylate resin I*[2] | 100 | 100 | 100 |
|  | Epoxy acrylate resin II*[3] | 65 | 65 | 65 |
| (3) | Glycidyl methacrylate | 50 | 50 | 50 |
| (6) | Mono(2-acryloyloxyethyl) acid phosphate | 15 | 15 | 15 |
| (7) | Ketjenblack*[4] |  | 15 | 20 |
|  | Graphite | 20 |  |  |
|  | Ni powder | 100 |  |  |
|  | Al powder |  | 100 | 80 |
|  | Cut carbon fiber |  |  | 10 |
| (4) | t-Butyl perbenzoate | 1.8 | | |
| (5) | Imidazole 2P4MZ | 2 | | |
| Carbon cloth | 1 sheet | | |
| Glass mat | | 1 sheet | |
| Glass cloth | | | 1 sheet |
| Properties | | | |
| Volume resistivity ($\Omega$-cm, 23° C.) | $4.1 \times 10^5$ | $1.7 \times 10^5$ | $2.2 \times 10^5$ |
| Bonding force | | | |
| Tensile shear strength (kg/cm$^2$) | 170 | 160 | 180 |
| Electrodeposition property | Good | Good | Good |

Note
*[1]same as in Table 7
*[2]same as in Table 7
*[3]same as in Table 7
*[4]same as in Table 7

From the results shown in Table 8, it is seen that each of the adhesives of Examples 45 through 47 has a low volume resistivity and a high bonding force (tensile shear strength) and has a good electrodeposition property with no coating unevenness.

EXAMPLES 48 THROUGH 52

Compositions shown in Table 9, which were prepared in the same manner as in Example 36, were sheeted on carbon cloth, glass mat and glass cloth shown in Table 9 to form sheet-like electroconductive adhesives having a thickness of 1.1 mm. With respect to each of these electroconductive adhesives, the volume resistivity and the bonding force (tensile shear strength) were measured, and the electrodeposition property at the electrodeposition coating was evaluated. The obtained results are shown in Table 9.

TABLE 9

| Component No. | Composition (parts) | Example No. 48 | 49 | 50 | 51 | 52 |
|---|---|---|---|---|---|---|
| (1) | Acrylic rubber*9 | 100 | 100 | 100 | 100 | 100 |
|  | NBR*10 | 30 | 30 | 30 | 30 | 30 |
| (2) | Epoxy acrylate resin I*2 | 80 | 80 | 80 | 80 | 80 |
|  | Epoxy acrylate resin II*3 | 80 | 80 | 80 | 80 | 80 |
| (3) | Glycidyl methacrylate | 40 | 40 | 40 | 40 | 40 |
| (6) | Mono(2-acryloyloxyethyl) acid phosphate | 10 | 10 | 10 | 10 | 10 |
| (7) | Ketjenblack*4 |  | 20 | 10 |  | 30 |
|  | Graphite |  |  | 20 | 30 |  |
|  | Ni powder |  |  | 80 | — |  |
|  | Al powder | 120 | 100 |  | 100 | 120 |
|  | Cut carbon fiber |  |  | 10 |  |  |
| (4) | t-Butyl perbenzoate | 1.5 | 1.5 | 1.5 | 1.5 | 1.5 |
| (5) | Imidazole C17Z*11 | 2.5 | 2.5 | 2.5 | 2.5 | 2.5 |
| Carbon cloth |  |  | 1 sheet | 1 sheet |  | 1 sheet |
| Glass mat |  | 1 sheet |  |  | 1 sheet | 1 sheet |
| Glass cloth |  |  |  | 1 sheet |  |  |
| Properties |  |  |  |  |  |  |
| Volume resistivity (Ω-cm, 23° C.) |  | $2.3 \times 10^5$ | $8.2 \times 10^5$ | $2.6 \times 10^5$ | $7.5 \times 10^5$ | $3.5 \times 10^5$ |
| Bonding force |  |  |  |  |  |  |
| Tensile shear strength (kg/cm²) |  | 160 | 150 | 165 | 174 | 155 |
| Electrodeposition property |  | Good | Good | Good | Good | Good |

Note
*2same as in Table 7
*3same as in Table 7
*4same as in Table 7
*9Nipol AR-31 supplied by Nippon Zeon Co.
*10Hycar CTBN 1300X13 supplied by B. F. Goodrich Co.
*112-heptadecylimidazole From the results shown in Table 9, it is seen that each of the electroconductive adhesives of Examples 48 through 52 has a low volume resistivity and a high bonding force (tensile shear strength) and has a good electrodeposition property with no coating unevenness. When the T-peel strength of the electroconductive adhesive of Example 48 was measured, it was found that the T-peel strength was 18 kg/25 mm of the width. Thus, it has been confirmed that the electroconductive adhesive of the present invention is excellent in both the tear shear strength and the peel strength.

EXAMPLE 53

In a pressure kneader, 100 parts by weight of an acrylonitrile/butadiene copolymer (Nipol 1072 supplied by Nippon Zeon Co.) as the component (1), 100 parts by weight of an epoxy acrylate resin A having terminal methacrylic groups, obtained by reacting Epikote 828 (supplied by Shell Chemical) with methacrylic anhydride, and 65 parts by weight of an epoxy acrylate resin having terminal methacrylic groups, obtained by reacting Epikote 1004 (supplied by Shell Chemical) with methacrylic acid, as the component (2), 30 parts by weight of tetrahydrofurfuryl acrylate as the component (3), 1.8 parts by weight of imidazole C17Z (2-heptadecylimidazole) as the component (5) and 35 parts by weight of Ketene Black (supplied by Akuzor Co.) as the component (7) were mixed together. Then, 1.8 parts by weight of t-butyl perbenzoate as the component (4) was added to the resulting mixture on a cooling mill so that heat was not generated, whereby an adhesive composition was obtained. The adhesive composition was coated on a carbon fiber strand mat having a width of 310 mm and a unit weight of 300 g/m² to obtain an electrically conductive adhesive having a thickness of 1 mm. The volume resistivity of this electrically conductive adhesive was as low as $2.2 \times 10^5$ Ω-cm. It was found that this electrically conductive adhesive showed a tensile shear strength of 187 kg/cm² and a T-peel strength of 20 kg/25 mm of the width.

We claim:

1. A structural adhesive which is obtained by impregnating, spread-coating or laminating a strand, surface mat, cloth, woven fabric or victoria lawn, composed of glass fiber, a glass fiber/organic fiber composite, an organic fiber or a carbon fiber, with an adhesive composition comprising (1) at least one polymer having polar groups, which is selected from the group consisting of acrylonitrile/butadiene copolymers, carboxyl group-containing acrylonitrile/butadiene copolymers, acrylic rubbers, urethane rubbers, chloroprene rubber, chlorosulfonated polyethylene, ethylene/vinyl acetate copolymers, ethylene/acrylic acid copolymers, thermoplastic polyurethanes, saturated polyesters and polyamides, (2) at least one epoxy acrylate resin, (3) at least one acrylic or methacrylic monomer selected from the group consisting of acrylic or methacrylic monomers having at least two different functional groups in the molecule, and acrylic or methacrylic monomers represented by the following general formula:

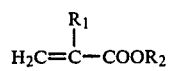

wherein R₁ is a hydrogen atom or a methyl group, and R₂ is an alkyl group having 1 to 18 carbon atoms or an organic residue containing an aromatic hydrocarbon ring or a heterocyclic ring, (4) an organic peroxide, (5) an imidazole or an amino compound containing at least one tertiary amino group, and (7) at least one electrically conductive material selected from the group consisting of carbon black having a surface area of 125 to 260 m²/g as determined by the N₂ adsorption method and a DBP oil absorption of 100 to 200 cc/100 g, ketjenblack, lamp black, acetylene black and graphite, and a cut carbon fiber and fine powders of aluminum, nickel, copper and zinc having a size not larger than 200 mesh.

2. A structural adhesive according to claim 1 wherein the amount of said electrically conductive material is 10 to 150 parts by weight based on 100 parts by weight of the polymer component (1).

3. An improvement in a structural adhesive which is obtained by impregnating, spread-coating or laminating a strand mat, surface mat, cloth, nonwoven fabric or victoria lawn, composed of a glass fiber, a glass fiber-/organic fiber composite, an organic fiber or a carbon fiber, with an adhesive composition comprising at least one polymer having polar groups and an organic peroxide, the improvement residing in that said adhesive composition further comprises (i) at least one epoxy acrylate resin, (ii) glycidyl acrylate or glycidyl methacrylate, (iii) an imidazole compound, and (iv) at least one electrically conductive material selected from the group consisting of carbon black having a surface area of 125 to 260 $m^2/g$ as determined by the $N_2$ adsorption method and a DBP oil absorption of 100 to 200 cc/100 g, ketjenblack, lamp black, acetylene black and graphite, and a cut carbon fiber and fine powders of aluminum, nickel, copper and zinc having a size not larger than 200 mesh.

* * * * *